(12) United States Patent
Gromley

(10) Patent No.: US 7,686,546 B1
(45) Date of Patent: Mar. 30, 2010

(54) PNEUMATIC TRANSPORT TUBE SYSTEM

(75) Inventor: Neil Gromley, Kensington, OH (US)

(73) Assignee: Diebold Incorporated, North Canton, OH (US)

( * ) Notice: Subject to any disclaimer, the term of this patent is extended or adjusted under 35 U.S.C. 154(b) by 407 days.

(21) Appl. No.: 11/519,555

(22) Filed: Sep. 12, 2006

Related U.S. Application Data

(60) Provisional application No. 60/717,431, filed on Sep. 14, 2005.

(51) Int. Cl.
*B65G 51/30* (2006.01)

(52) U.S. Cl. .............. 406/179; 406/110; 406/176; 406/184

(58) Field of Classification Search ........... 406/10, 406/109–112, 179, 192, 195, 83, 84, 176–178, 406/180
See application file for complete search history.

(56) References Cited

U.S. PATENT DOCUMENTS

| | | | | |
|---|---|---|---|---|
| 730,715 | A * | 6/1903 | Steinbock E | 406/177 |
| 735,861 | A * | 8/1903 | Davis | 406/21 |
| 968,566 | A * | 8/1910 | Jennings | 406/16 |
| 992,223 | A * | 5/1911 | MacLaren | 406/26 |
| 1,031,866 | A * | 7/1912 | Pearshall | 406/110 |
| 1,454,169 | A * | 5/1923 | Hepperle | 406/192 |
| 1,807,096 | A * | 5/1931 | Zimmer | 406/110 |
| 1,810,269 | A * | 6/1931 | Emerson | 406/112 |
| 1,813,487 | A * | 7/1931 | Emerson | 406/19 |
| 1,814,222 | A * | 7/1931 | Morehouse | 406/112 |
| 1,849,119 | A * | 3/1932 | Stoetzel | 406/180 |
| 1,861,964 | A * | 6/1932 | Jennings | 406/12 |
| 1,963,779 | A * | 6/1934 | Cutting | 406/35 |
| 1,971,142 | A * | 8/1934 | Jennings | 406/111 |
| 1,972,272 | A * | 9/1934 | Needham | 406/19 |
| 2,034,918 | A * | 3/1936 | Needham et al. | 406/110 |
| 2,763,446 | A * | 9/1956 | Hanson | 406/13 |
| 2,890,913 | A * | 6/1959 | Miskel et al. | 406/110 |
| 3,080,136 | A * | 3/1963 | Keiley et al. | 406/111 |
| 3,189,297 | A * | 6/1965 | Ellithorpe | 406/111 |
| 3,237,881 | A * | 3/1966 | Grosswiller, Jr. et al. | 406/19 |
| 3,237,882 | A * | 3/1966 | Grosswiller, Jr. et al. | 406/110 |
| 3,282,531 | A * | 11/1966 | Stewart | 406/28 |
| 3,419,229 | A * | 12/1968 | Crosby | 406/110 |
| 3,601,337 | A * | 8/1971 | Bullock et al. | 406/28 |
| 3,610,554 | A * | 10/1971 | Schwarz et al. | 406/112 |
| 3,612,438 | A * | 10/1971 | Herndon | 406/190 |
| 3,659,809 | A * | 5/1972 | Cook | 406/112 |

(Continued)

*Primary Examiner*—Gene Crawford
*Assistant Examiner*—William R Harp
(74) *Attorney, Agent, or Firm*—Ralph E. Jocke; Daniel D. Wasil; Walker & Jocke

(57) ABSTRACT

A pneumatic transfer system includes a service provider terminal and a customer terminal. A carrier is moved through a transfer conduit between the customer and service provider terminals by a differential pressure generating mechanism. Each of the customer terminal and the service provider terminal includes a valve assembly to control air flow on the lower side of the carrier as it moves in the transfer conduit. Each valve assembly includes elongated valve openings in the terminal housing and a gate assembly for selectively blocking air flow through the valve openings. The valve openings are angularly disposed from the carrier transfer opening in the terminal. The valve assemblies may be selectively operated to control air flow during dispatch of the carrier from one terminal and descent of the carrier into the other terminal.

34 Claims, 10 Drawing Sheets

U.S. PATENT DOCUMENTS

| | | | |
|---|---|---|---|
| 3,689,009 A * | 9/1972 | Terrell | 406/110 |
| 3,706,428 A * | 12/1972 | Carlier | 406/110 |
| 3,711,038 A * | 1/1973 | Van Otteren | 406/19 |
| 3,756,536 A * | 9/1973 | Weissmuller et al. | 406/112 |
| 3,761,039 A * | 9/1973 | Hazell | 406/111 |
| 3,778,006 A * | 12/1973 | Martin | 406/112 |
| 3,790,101 A * | 2/1974 | Weissmuller | 406/105 |
| 3,790,102 A * | 2/1974 | Tearne et al. | 406/112 |
| 3,830,446 A * | 8/1974 | Rudder et al. | 406/110 |
| 3,841,584 A * | 10/1974 | Robinson et al. | 406/21 |
| 3,948,466 A * | 4/1976 | Rudder et al. | 406/73 |
| 3,964,693 A * | 6/1976 | Thomas | 406/179 |
| 3,976,264 A * | 8/1976 | Ekama et al. | 406/112 |
| 3,985,316 A * | 10/1976 | Weissmuller | 406/110 |
| 3,998,405 A * | 12/1976 | Carlier | 406/112 |
| 4,004,753 A * | 1/1977 | Thomas et al. | 406/110 |
| 4,032,082 A * | 6/1977 | Weissmuller | 406/112 |
| 4,047,677 A * | 9/1977 | Hochradel et al. | 406/110 |
| 4,059,246 A * | 11/1977 | Anders et al. | 406/31 |
| 4,135,684 A * | 1/1979 | Willey | 406/13 |
| 4,180,354 A * | 12/1979 | Greene | 406/112 |
| 4,189,260 A * | 2/1980 | Morano et al. | 406/76 |
| 4,189,261 A * | 2/1980 | Kelley et al. | 406/112 |
| 4,239,420 A * | 12/1980 | Thibonnier et al. | 406/2 |
| 4,256,418 A * | 3/1981 | Stangl | 406/112 |
| 4,315,704 A * | 2/1982 | Kelley et al. | 406/12 |
| 4,325,660 A * | 4/1982 | Jones | 406/84 |
| 4,343,574 A * | 8/1982 | Anders | 406/13 |
| 4,352,603 A * | 10/1982 | Anders | 406/27 |
| 4,395,164 A * | 7/1983 | Beltrop et al. | 406/74 |
| 4,436,456 A * | 3/1984 | Thomas | 406/19 |
| 4,437,797 A * | 3/1984 | Kardinal | 406/110 |
| 4,459,069 A * | 7/1984 | Ahr et al. | 406/74 |
| 4,462,721 A * | 7/1984 | Anders et al. | 406/112 |
| 4,465,410 A * | 8/1984 | Vogel et al. | 406/111 |
| 4,466,761 A * | 8/1984 | Beltrop et al. | 406/74 |
| 4,512,688 A * | 4/1985 | Hochradel | 406/111 |
| 4,661,026 A * | 4/1987 | Carlier | 406/74 |
| 4,710,098 A * | 12/1987 | Anders et al. | 415/149.1 |
| 4,820,086 A * | 4/1989 | Kieronski | 406/112 |
| 4,913,598 A * | 4/1990 | Dozier | 406/112 |
| 4,930,941 A * | 6/1990 | Willey et al. | 406/10 |
| 4,941,777 A * | 7/1990 | Kieronski | 406/13 |
| 4,960,350 A * | 10/1990 | Tsubata et al. | 406/84 |
| 4,971,481 A * | 11/1990 | Foreman | 406/15 |
| 4,984,939 A * | 1/1991 | Foreman et al. | 406/84 |
| 5,092,714 A * | 3/1992 | Porter et al. | 406/186 |
| 5,127,773 A * | 7/1992 | Foreman et al. | 406/179 |
| 5,131,792 A * | 7/1992 | Grosswiller et al. | 406/112 |
| 5,211,513 A * | 5/1993 | Scott | 406/112 |
| 5,215,412 A * | 6/1993 | Rogoff et al. | 406/112 |
| D341,014 S * | 11/1993 | Grosswiller et al. | D18/35 |
| 5,299,891 A * | 4/1994 | Grosswiller et al. | 406/112 |
| 5,304,017 A * | 4/1994 | Vogel et al. | 406/111 |
| 5,368,417 A * | 11/1994 | Benjamin et al. | 406/111 |
| D361,194 S * | 8/1995 | Grosswiller et al. | D18/35 |
| 5,473,114 A * | 12/1995 | Vogel | 174/47 |
| 5,562,367 A * | 10/1996 | Scott | 406/13 |
| 5,564,868 A * | 10/1996 | Vogel et al. | 406/112 |
| 5,735,644 A * | 4/1998 | Grosswiller et al. | 406/112 |
| 6,039,510 A * | 3/2000 | Greene et al. | 406/21 |
| 6,146,057 A * | 11/2000 | Gromley et al. | 406/10 |
| 6,164,491 A * | 12/2000 | Bustos et al. | 221/211 |
| 6,322,295 B1 * | 11/2001 | Gabriele | 406/84 |
| 6,652,198 B2 * | 11/2003 | Nickoson | 406/13 |
| 6,939,088 B2 * | 9/2005 | Farrell | 406/192 |
| 6,955,506 B2 * | 10/2005 | Kuhnau et al. | 406/83 |
| 7,220,082 B1 * | 5/2007 | Christian et al. | 406/112 |
| 7,234,898 B2 * | 6/2007 | Brown | 406/110 |
| 7,264,421 B2 * | 9/2007 | Brown | 406/112 |

* cited by examiner

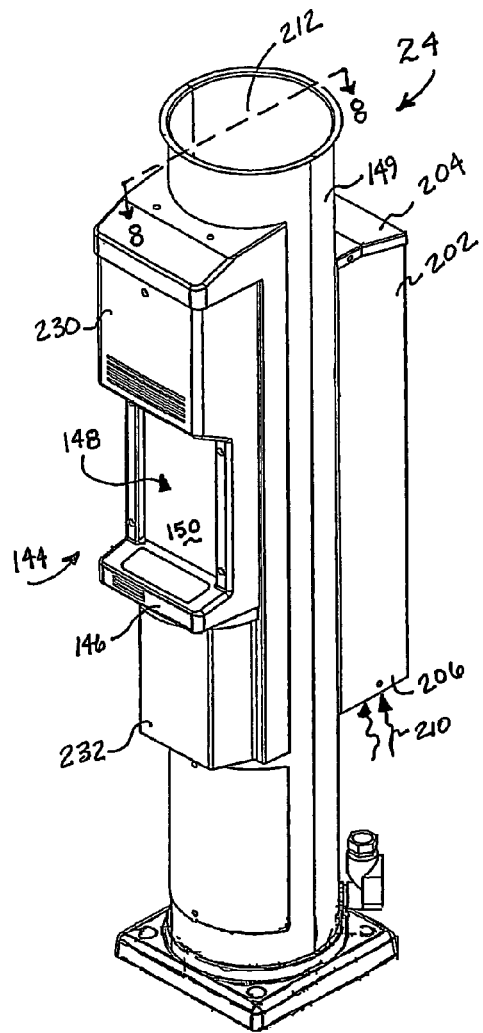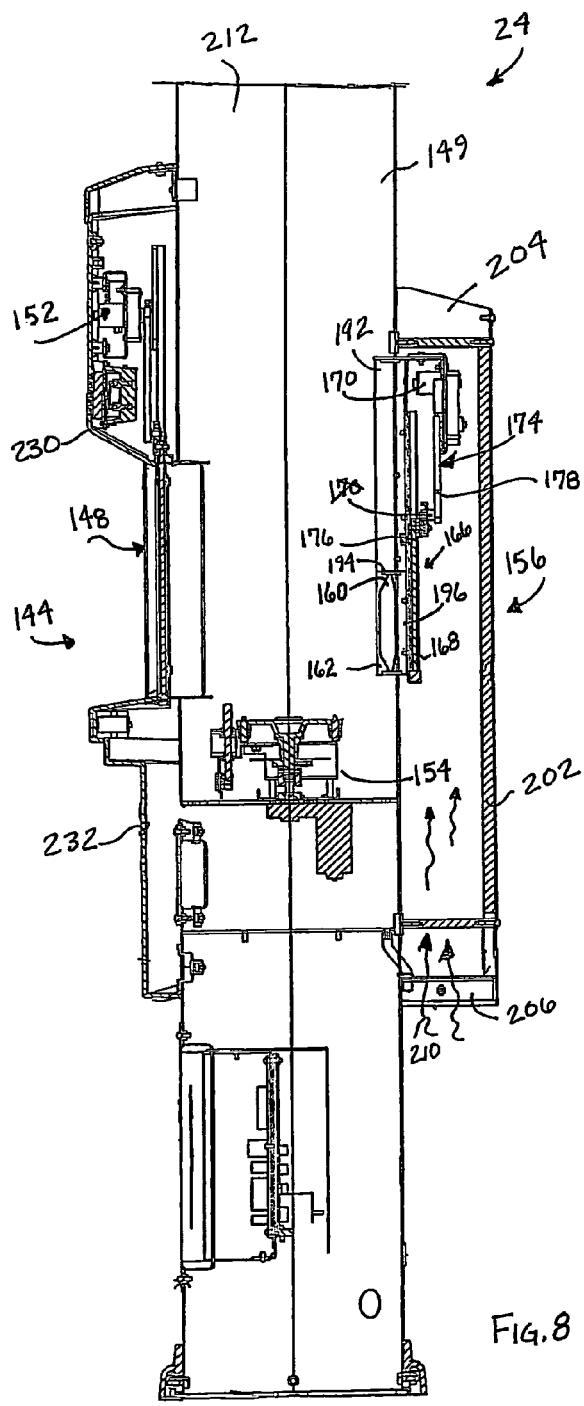
Fig. 7
Fig. 8

PNEUMATIC TRANSPORT TUBE SYSTEM

CROSS REFERENCE TO RELATED APPLICATION

This Application claims benefit pursuant to 35 U.S.C. §119(e) of Provisional Application Ser. No. 60/717,431 filed Sep. 14, 2005, which is incorporated herein by reference.

TECHNICAL FIELD

This invention relates to devices and systems for transporting items from one location to another. Specifically, this invention relates to a pneumatic transfer apparatus and system having a valve assembly operable to control the dispatch and arrival of a pneumatic carrier between a service provider and a customer terminal.

BACKGROUND ART

Systems which transport items between stations are known in the prior art. Some prior art transfer systems include systems in which items are moved between a service provider and a customer in a carrier that is moved through a transfer conduit. The carrier is moved through the transfer conduit by differential pressure that is selectively produced in areas of the conduit. The differential pressure is commonly produced by drawing a vacuum in the area into which the carrier is to be moved, or by producing a positive pressure in the area behind the carrier, or both. In either event the differential pressure between the areas in front and behind the carrier propels it through the transfer conduit.

It has been observed that undesired carrier movement and/or excessive noise has been associated with prior transfer systems. Thus, there exists a need in the art for a pneumatic transfer system that eliminates or reduces the unwanted effects associated with prior systems. In particular, there exists a need in the art for a pneumatic transfer system that controls movement of a carrier to reduce jouncing or other undesirable movement of the carrier in the terminal. In addition, there exists a need in the art for a pneumatic transfer system that utilizes a valve mechanism in which air flows along a path which does not interfere with other system mechanisms.

DISCLOSURE OF INVENTION

It is an object of exemplary embodiments to provide a pneumatic transfer system for transporting items between a first station and a second station.

It is a further object of exemplary embodiments to provide constructions for service provider and customer terminals that reduce jouncing of the carrier as the carrier enters the terminals.

It is a further object of exemplary embodiments to provide service provider and customer terminals in which noise levels are reduced as compared to prior systems.

It is a further object of exemplary embodiments to provide more efficient transfer of a carrier between terminals through a transfer conduit.

Further objects of exemplary embodiments will be made apparent in the following Best Modes for Carrying Out Invention and the appended claims.

The foregoing objects, and others, are accomplished in an exemplary embodiment by a pneumatic transfer system having a service provider terminal comprising a tubular housing having a transfer opening therein for accessing a pneumatic carrier. Access through the transfer opening is controlled by a door assembly including a movable door. An air flow mechanism controls air flow into and out of the housing interior through a valve located at a valve location circumferentially spaced from the transfer opening. A gate assembly, including a movable gate member, selectively blocks and enables air flow through the valve.

The air flow mechanism also includes a cover assembly mounted to the housing in covering relationship with the gate assembly. In an exemplary service provider terminal, the cover assembly has an open top end and a capped bottom end. The cover assembly defines an air flow channel selectively in flow communication with the housing interior through the valve when the gate member is disposed away from a blocking position. In the exemplary service provider terminal, the gate member may be selectively lowered away from the blocking position, or raised into the blocking position through action of a gate actuator mechanism connected to the lower end of the gate member. In this manner the gate member is selectively moved to control the extent of air flow into and out of the tubular housing. Further in the exemplary embodiment the openings are positioned so that when a carrier is positioned to be accessible to a user the openings do not extend above the upper seal ring on the carrier and also do not extend below the lower seal ring on the carrier. This approach is used in the exemplary embodiment to assure that air pressure cushions the carrier as it enters the terminal and comes to rest, as well as that air pressure can act on the carrier to move it out of the terminal.

In an exemplary embodiment, the valve includes two adjacent elongated openings in the housing. The openings may each have a shape similar to a hexagon projected onto a curved surface. The valve location of the exemplary embodiment may be circumferentially disposed at least 90° from the transfer opening.

The pneumatic transfer system may include a customer terminal comprising a tubular housing having a transfer opening therein for accessing the pneumatic carrier. Access through the transfer opening is controlled by a door assembly including a movable door. An air flow mechanism controls air flow into and out of the housing interior through a valve located at a valve location circumferentially spaced from the transfer opening. A gate assembly, including a movable gate member, selectively controls air flow through the valve.

The air flow mechanism also includes a cover assembly mounted to the customer terminal housing in covering relationship with the gate assembly. In an exemplary customer terminal, the cover assembly has a capped top end and an open bottom end. The cover assembly defines an air flow channel selectively in flow communication with the customer terminal housing interior through the valve when the gate member is disposed away from a blocking position. In the exemplary customer terminal, the gate member may be selectively raised away from the blocking position, or lowered into the blocking position through action of a gate actuator mechanism connected to the upper end of the gate member.

In an exemplary embodiment, the valve includes two adjacent elongated openings in the customer terminal housing. The openings may each have a shape similar to a hexagon projected onto a curved surface. The valve may be circumferentially disposed 180° from the transfer opening in an exemplary embodiment.

The exemplary pneumatic transfer system may include a control mechanism in operative connection with the door assemblies and the air flow mechanisms to cause predetermined relative movement between the first door, the second door, the first gate member, and the second gate member.

The exemplary pneumatic transfer system may include a transfer conduit extending between the service provider terminal and the customer terminal, and a carrier movable between the service provider terminal and the customer terminal within the transfer conduit. The carrier includes annular seals adjacent each longitudinal end that slidably engage the inner wall of the transfer conduit such that the carrier moves responsive to a differential pressure generating mechanism which operates responsive to the control mechanism.

BRIEF DESCRIPTION OF DRAWINGS

FIG. 7 is an isometric view of a customer terminal of the system shown in FIG. 1.

FIG. 8 is a cross sectional view of the customer terminal along line 8-8 in FIG. 7.

BEST MODES FOR CARRYING OUT INVENTION

Figure 1:
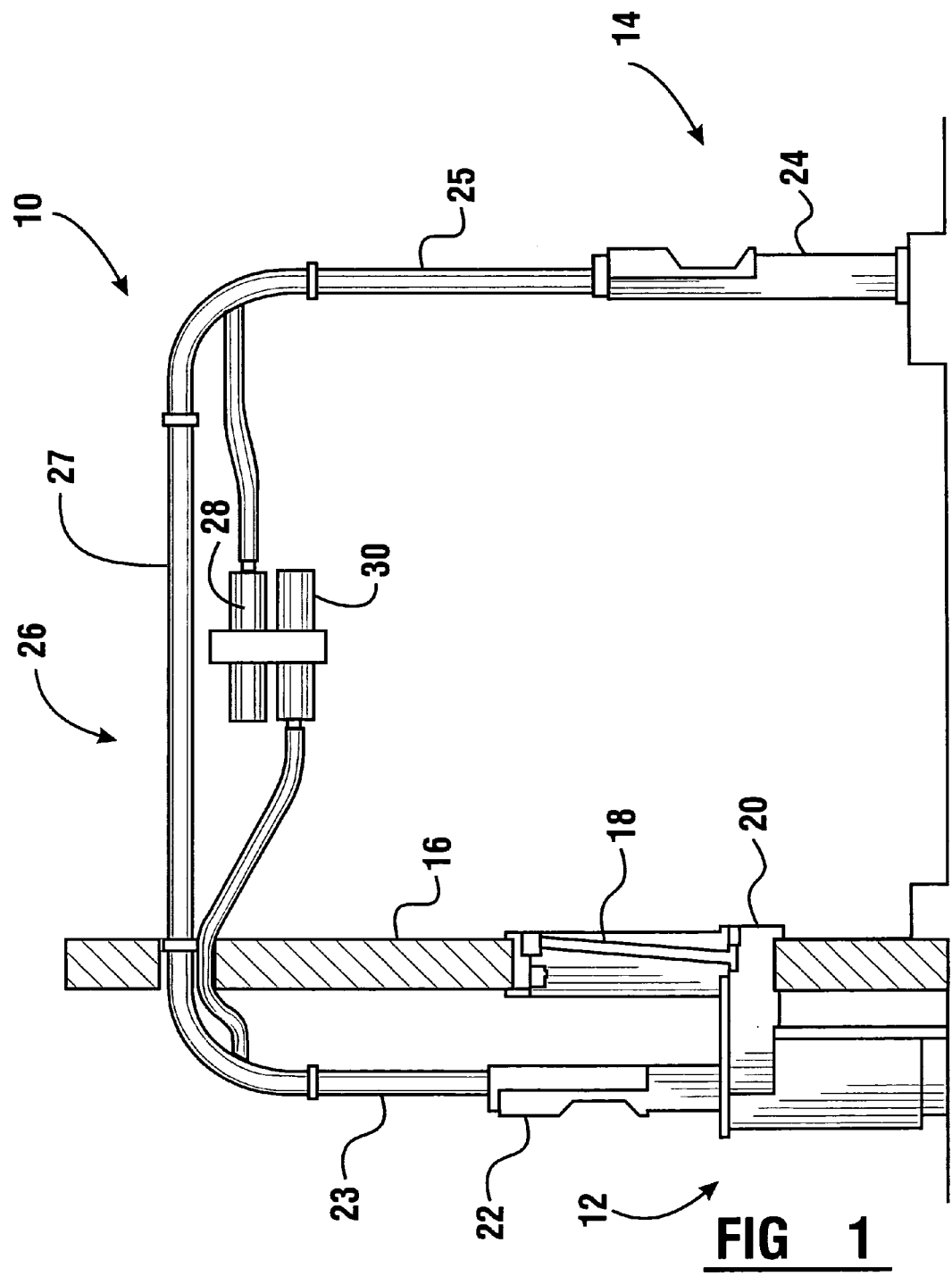
FIG. 1 is a schematic view of a pneumatic transfer system of an exemplary embodiment.
Figure 2:
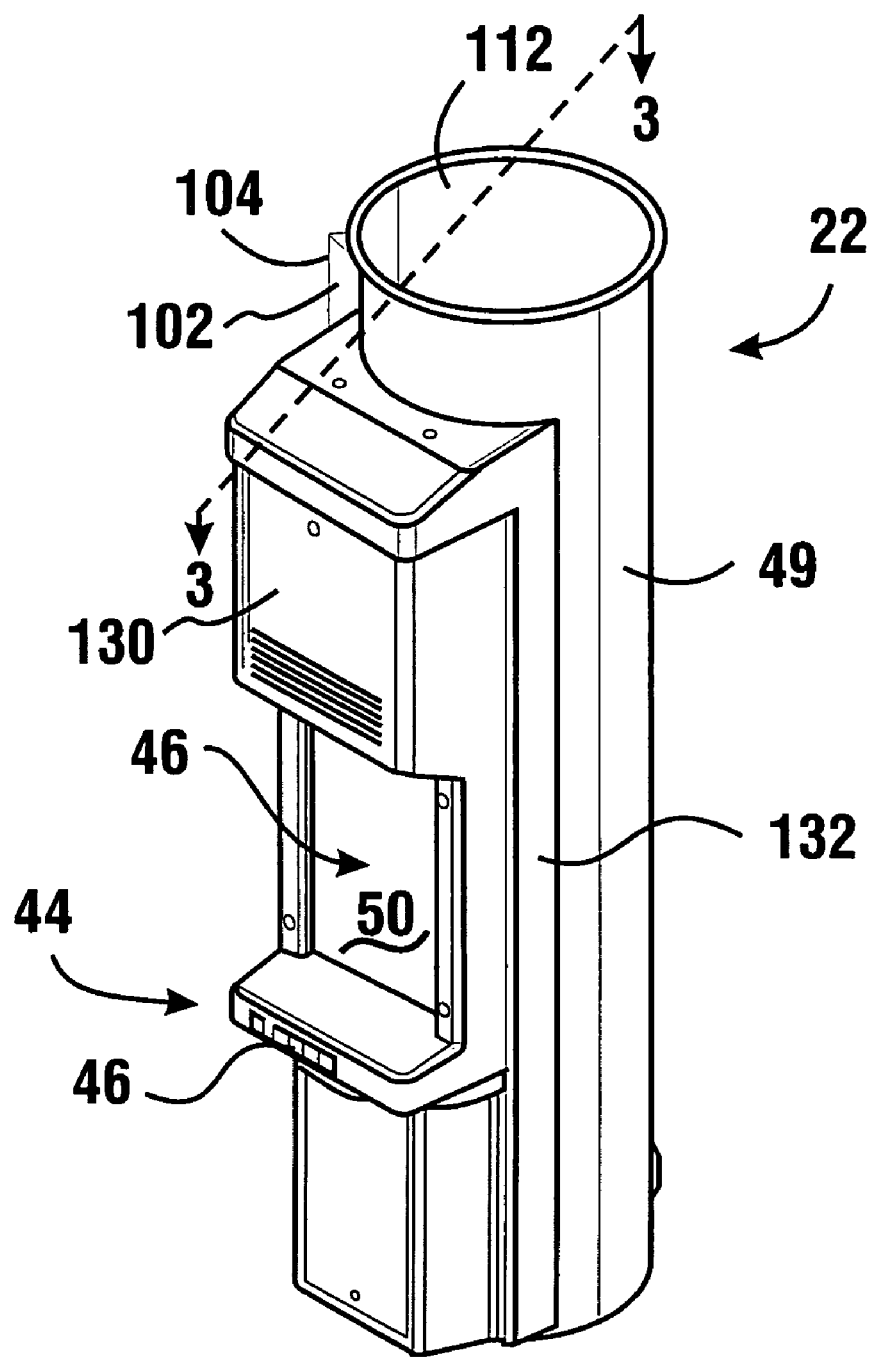
FIG. 2 is an isometric view of a service provider terminal of the system shown in FIG. 1.

Referring now to the drawings and particularly to FIG. 1, there is shown therein an exemplary embodiment of a pneumatic transfer system 10. The system 10 includes a service provider station 12 and a customer station 14. In the embodiment shown, the service provider station 12 is preferably operated by a service provider within a facility such as a store, pharmacy, or banking institution. The customer station 14 in the exemplary embodiment is at a drive through or walk up location located outside the facility. Of course, embodiments may be used in many other transaction environments as well.

System 10 is installed through a building wall 16, which in the embodiment shown is an exterior building wall. Wall 16 has installed therein a drive through window 18 which enables a service provider to observe customers at the customer station. The exemplary service provider station may also include a retractable drawer mechanism 20, which a service provider may selectively extend or retract to exchange items or documents with customers. It is within the scope of the present invention to provide other configurations for the service provider and customer stations.

The service provider station 12 includes a service provider terminal 22. Customer station 14 includes a customer terminal 24. Terminals 22 and 24 are connected by a transfer conduit 26. Transfer conduit 26 includes a first generally vertically extending leg portion 23 which is in communication with the service provider terminal 22. Transfer conduit 26 further includes a second generally vertically extending leg portion 25 which is in communication with the customer station 24. A transversely extending portion 27 extends generally horizontally between the first and second leg portions. The transverse portion 27 is connected to the leg portions through radiused bends in the conduit which are suitably radiused to enable the passage of the carrier therethrough.

In this exemplary embodiment, a first blower 28 is connected to transfer conduit 26 generally in the area above customer terminal 24. Blower 28 may be selectively operated to draw a vacuum in the transfer conduit in the area generally above the customer terminal. Blower 28 further includes suitable valving so that when the blower 28 is not operated, air is generally prevented from entering the transfer conduit 26 through blower 28.

In this exemplary embodiment, a second blower 30 similar to blower 28 is connected to the transfer conduit in an area generally above service provider terminal 22. Blower 30 may be operated to selectively produce a vacuum in the transfer conduit above the service provider terminal. Like blower 28, when blower 30 is not operating air is generally prevented from entering the transfer conduit through the blower 30.

In an exemplary embodiment, a carrier (not shown) is enabled to be selectively moved between the service provider terminal and the customer terminal by the differential pressure produced by blowers 28 and 30.

The service provider terminal 22 is shown in greater detail in FIGS. 2 through 6. The exterior of the service provider terminal includes a service provider interface generally indicated 44. Interface 44 includes a control panel 46. Control panel 46 includes buttons and indicators which are used by a service provider to cause the carrier to move between the stations of the systems, as well as to input other commands. In exemplary embodiments the control panel 46 includes a button which may be actuated to cause associated control circuitry to operate components of the system to cause the transfer of the carrier from the service provider station to the customer station. Another button included on the control panel may be actuated to cause movement of the carrier from the customer station to the service provider station.

Other exemplary embodiments may include an audio interface which includes a microphone and speaker or comparable communication devices. These devices enable the service provider to audibly communicate with the customer through similar devices at the customer station. Buttons on the control panel 46 may be selectively actuated by the service provider and enable the service provider to speak to and/or listen to a customer at the customer station. Some embodiments may include features disclosed in U.S. patent application Ser. No. 11/100,148 filed Apr. 5, 2005, which is incorporated herein by reference.

The control panel 46 may further include indicator lights or other devices for providing the service provider with information concerning the status of components in the system.

The service provider terminal 22 further includes a transfer opening 48. The transfer opening 48 extends through a tubular housing 49 and enables access to the carrier. The exemplary service provider terminal 22 may be used in a captive carrier system such as that described in U.S. Pat. No. 6,146,057, the disclosure of which is incorporated herein by reference. In the exemplary embodiment shown, the service provider is enabled to place items to be transferred to the customer into an interior area of a captive carrier when the carrier is positioned at the service provider station. However, other embodiments may utilize "non-captive" carriers.

In the exemplary embodiment, the transfer opening 48 includes a door 50. Door 50 is preferably a sliding-type door that is movable up and down so as to selectively cover or enable access to the carrier through transfer opening 48. Door 50 is moved between its respective positions by a door moving mechanism 52. The door moving mechanism for door 50 will be preferably similar to that shown in U.S. Pat. No. 5,299,891, the disclosure of which is incorporated herein by reference. The door moving mechanism controls the opening and closing of door 50 at appropriate times under the control of the control mechanism of the system. The door 50 also provides a generally fluid tight seal that blocks air movement through the opening when in the closed position.

In the particular embodiment shown, in a manner similar to that described in the incorporated disclosure of U.S. Pat. No. 6,146,057, a carrier actuator mechanism 54 extends in the transfer conduit below the transfer opening 48. The carrier actuator mechanism operates to orient the carrier after it arrives at the service provider station. After the carrier is oriented, the carrier actuator mechanism further operates to hold the carrier in the desired orientation as the carrier is opened so as to enable the service provider to access its interior area. The actuator mechanism 54 is supported on a plate 55 which generally does not enable air flow therethrough. Of course, this is merely an exemplary embodiment of a service provider terminal 22 and other embodiments may include other arrangements and constructions.

In some prior systems, such as the type disclosed in U.S. Pat. No. 6,146,057, a valve assembly is disposed generally beneath the carrier actuator mechanism in the terminals to block air flow out of the housing as a carrier moves downward and arrives at the terminal, and which opens to supply atmospheric air behind the carrier to propel the carrier from the terminal when negative pressure is produced ahead of the carrier. Certain drawbacks of prior systems are addressed by the air flow mechanisms of exemplary embodiments. In particular, in the prior construction, the carrier actuator mechanism is situated above the valve assembly and directly in the path of the air flow. This can draw dust and contaminants onto the mechanism. In addition the valve opens responsive to negative pressure above the valve which generally results in substantial noise as the valve opens. Substantial noise is also produced by the flow of air through an open valve.

Figure 5:
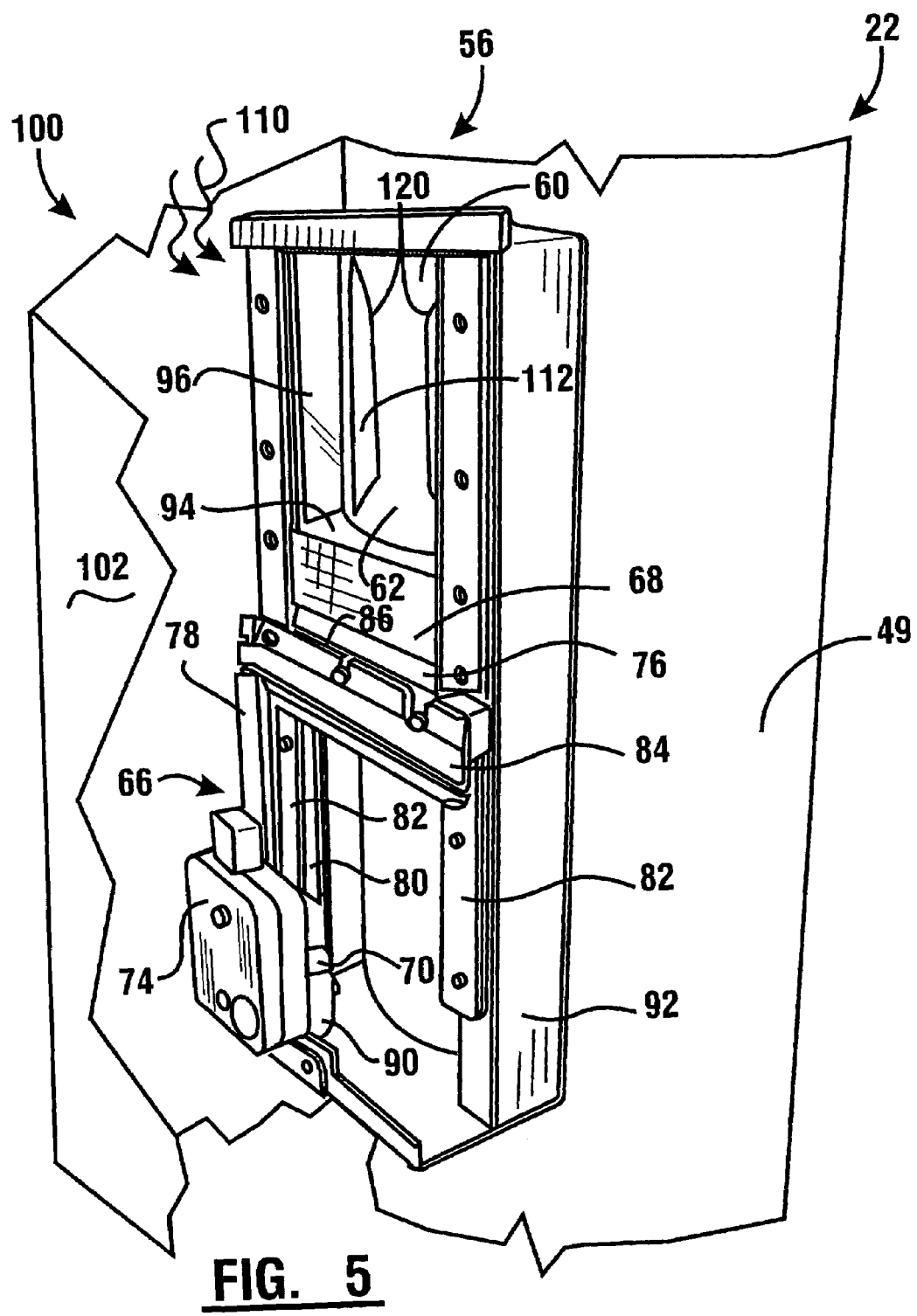
FIG. 5 is an isometric view, partially broken away, of an exemplary air flow mechanism.

With particular reference to FIG. 5, in the exemplary embodiment, an air flow mechanism, generally denoted 56, operates to control the passage of air generally to and from the service provider terminal 22 through housing 49. The exemplary air flow mechanism includes a valve 60 which is associated with at least one opening extending through the housing 49 at a valve location 62 which is circumferentially disposed from the transfer opening 48. In this exemplary embodiment, the valve location 62 is generally axially aligned, but circumferentially disposed approximately 90° or more from the transfer opening 48. The configuration is merely exemplary and other constructions may be used which employ the principles of the present invention.

Air flow through the valve 60 is controlled by operation of a gate assembly, generally denoted 66, which includes a generally planar gate member 68. The gate member 68 is selectively positionable in a range from a blocking position in which the gate member blocks air flow through the valve 60 (see FIG. 5), and an open position away from the blocking position (see FIG. 6). The rate of air flow through the valve 60 is related to the extent of displacement of the gate member 68 away from the blocking position.

The exemplary gate assembly 66 also includes a reversible motor 70 and a gate actuator mechanism 74. In the exemplary service provider terminal 22, the gate actuator mechanism is in operable connection with a lower end 76 of the gate member 68 to selectively lower the gate member 68 away from the blocking position or raise the gate member into the blocking position responsive to operation of motor 70. Of course suitable circuitry which may include power sources, relays, circuit card assemblies, limit switches and other suitable components, is provided for controlling the operation of motor 70 responsive to user inputs.

The exemplary gate actuator mechanism 74 includes an elongated actuator arm 78 operatively connecting the motor 70 with gate member 68. Gate member 68 is generally comprised of a rectangular, planar sheet member dimensioned to be received within U-shaped slots 80 of the guide members 82 and to be movable therein. An actuator track 84 is disposed along the lower end 76 and includes an elongated slot 86 which is oriented to be generally perpendicular to the path of travel of gate member 68. Slot 86 is dimensioned to receive a pin 88 which is mounted in supporting connection with one end of elongated actuator arm 78. The other end of actuator arm 78 is operably connected to motor 70. Motor 70 is supported by a motor mount bracket 90.

The exemplary gate assembly 66 is mounted in supporting connection with a frame member 92, which may be welded or otherwise formed with or mounted to the housing in a generally fluid tight manner. The frame member 92 may include a dividing wall 94 operative to define an air chamber 96. In the exemplary embodiment, the range of travel of the gate member 68 generally coincides with the height of the air chamber 96. The gate assembly 66 includes various resilient seal members and gaskets to reduce or prevent undesirable air flow through the gate assembly when the gate member is in the blocking position.

Figure 4:
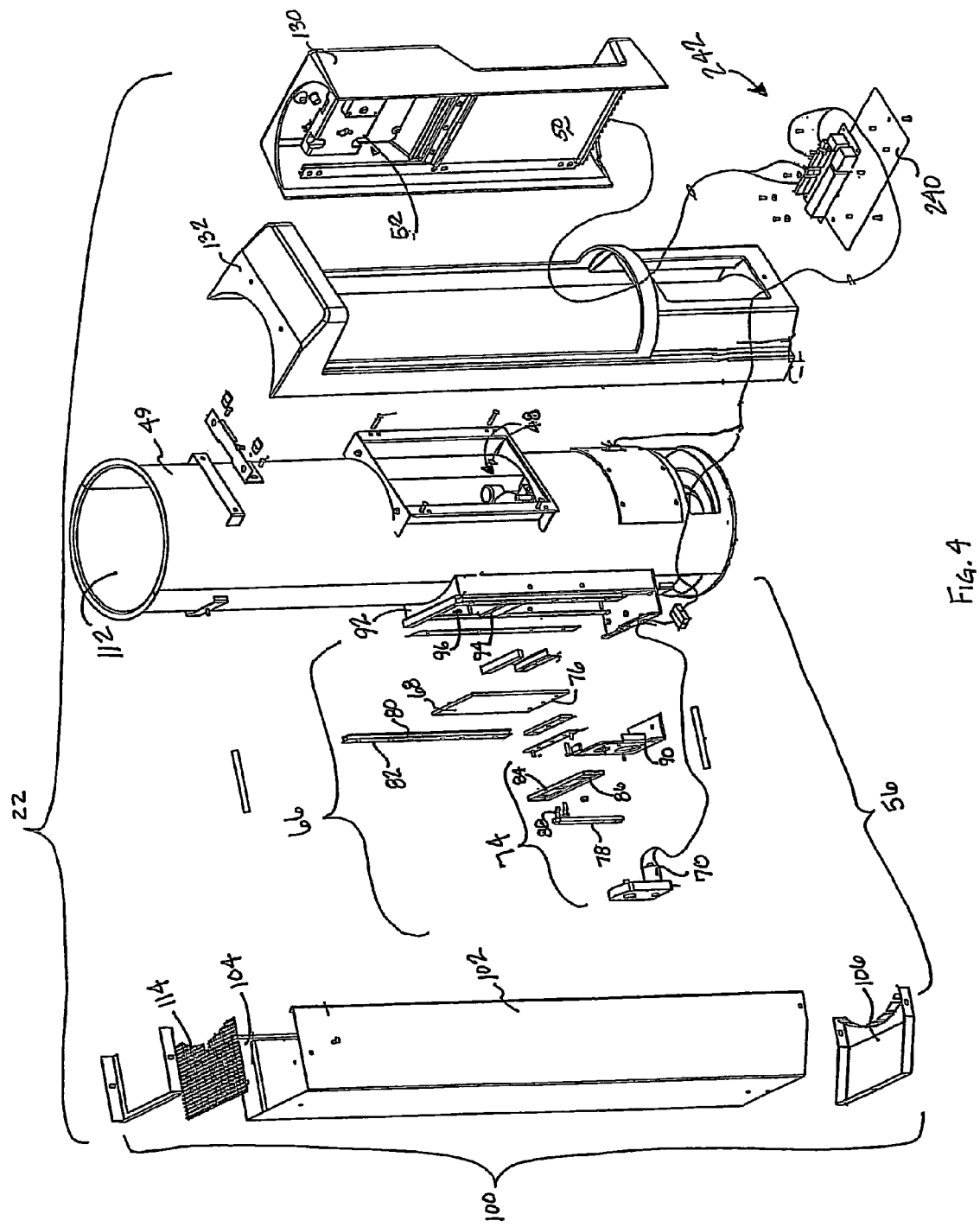
FIG. 4 is an exploded view of the service provider terminal of FIG. 2.

With reference to FIGS. 4 and 5, the air flow mechanism 56 further includes a cover assembly, generally denoted 100. The cover assembly 100 includes an axially elongated housing member 102 mounted in supporting connection with housing 49 in covering relationship with the gate assembly. In the exemplary service provider terminal 22, the housing member 102 has an open top end 104 and a closed or capped bottom end 106. The housing member 102 defines a channel for air flow, illustrated by arrows 110, in flow communication with the interior 112 of housing 49 through the valve 60 through which air flows when the gate member 68 is displaced away from the blocking position. In the exemplary embodiment, a screen member 114 is positioned between the open top end 104 and the valve location 62 in order to filter air and muffle noise as it flows in the air flow mechanism 56. The valve and the transfer opening are generally axially aligned. Thus, if a carrier actuator mechanism 54 is utilized for moving the carrier to a desired angular position as in the incorporated patent disclosure, the mechanism is not directly in the path of the air flow.

Figure 6:
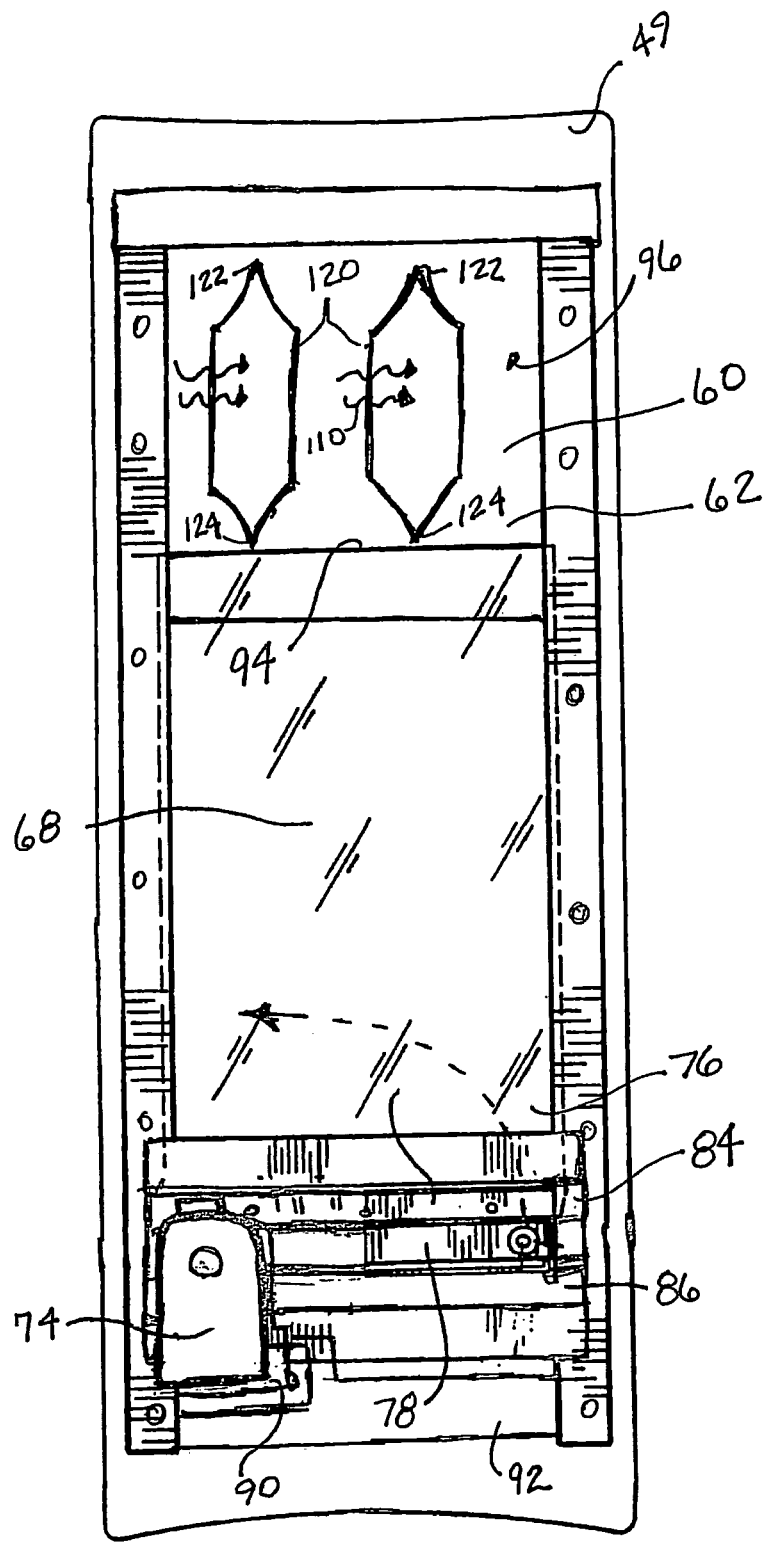
FIG. 6 is a view of a gate assembly illustrating the operation thereof.

With particular reference to FIGS. 5 and 6, in the exemplary embodiment, valve 60 is associated with at least one, and preferably two, elongated valve openings 120 through housing 49. Openings 120 provide for the passage of air between the atmosphere and the interior 112 of the housing 49, and ultimately to the transfer conduit 26. In the exemplary embodiment, each valve opening 120 comprises a shape similar to a hexagon projected onto a curved surface. In the exemplary embodiment, the valve openings 120 are disposed in adjacent relationship with a line joining opposed vertices 122, 124 being parallel to the longitudinal axis of the housing 49. In the exemplary embodiment the uppermost end of the openings extend to a position which is below the upper seal ring on the carrier when the carrier is positioned fully downward in the terminal so as to be accessible to the user. The lowermost end of each opening extends downward to a level that is above the lower seal ring on the carrier when the carrier is in the accessible position. The exemplary openings are bounded at the ends by tapered surfaces relative to the vertical longitudinal axis of the housing. In the exemplary embodiment the openings are bounded by a pair of tapered surfaces that converge toward a point. This approach may facilitate air flow and avoid catching seal rings on the carrier. This construction and arrangement of valve openings 120 is merely exemplary and other arrangements and constructions may be used.

The exemplary valve openings 120 permit atmospheric air to pass into the housing interior 112 when gate member 68 is lowered away from the blocking position. In the exemplary embodiment atmospheric pressure is applied below the upper seal ring on the carrier when the carrier is accessible to the user and is positioned fully downward in the terminal. If the carrier is being dispatched from the service provider terminal 22 the atmospheric pressure causes the negative pressure applied above the upper seal ring to move the carrier upward beyond the openings. Air pressure then acts behind the lower seal ring as the carrier moves upward. If the carrier is being received by moving downward into service provider terminal 22, the valve openings 120 permit air to pass out of the housing in front of the carrier if the gate member is disposed away from the blocking position to help control descent of the carrier and reduce noise levels and jouncing of the carrier as the carrier moves downward. The shape and position of the valve openings operates to control air flow. Further the valve openings do not extend so low that even if the gate member is open, the end of the carrier's downward travel is cushioned by air in the cavity in the terminal below the lower seal ring on the carrier. Of course this approach is exemplary.

Figure 3:
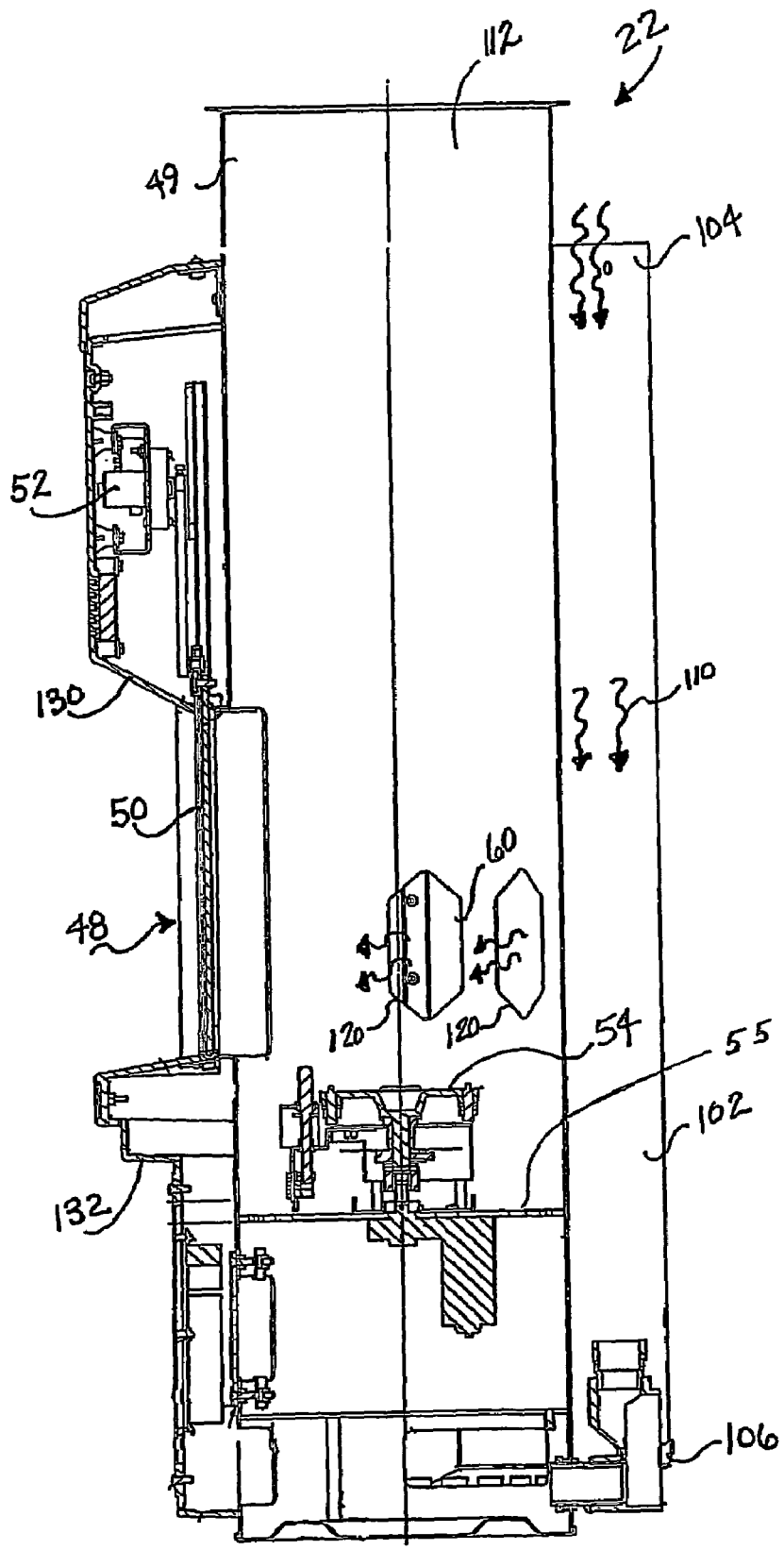
FIG. 3 is a cross sectional view of the service provider terminal along line 3-3 in FIG. 2.

As shown in FIGS. 3 and 4, the door 50 and door moving mechanism 52 may be supported and operable within a facade member 130 that is mounted in supporting connection with housing 49. Service provider terminal 22 may also include a fascia 132.

An exemplary embodiment of customer terminal 24 is shown in greater detail in FIGS. 7 through 10. The customer terminal 24 includes an interface 144. The interface 144 includes a control panel 146. The control panel is preferably simpler than the control panel of the service provider terminal 22. The control panel 146 preferably includes buttons which enable a customer to cause the dispatch a carrier from the customer terminal to the service provider terminal, as well as to signal a service provider at the service provider station. In addition, control panel 146 may include indicators for indicating to the customer various conditions as to the status of the system. The control panel is in operative connection with control circuitry that operates the blowers, actuators and other components to move the carrier.

Interface 144 of the customer terminal 24 also preferably includes a microphone and speaker mechanism or other communication devices. Thus, the customer may audibly communicate with the service provider. Alternate embodiments may include visual communication devices and other devices for communicating between a customer and service provider.

The customer terminal 24 includes a transfer opening 148. Transfer opening 148 extends through the customer terminal housing 149 in a manner similar to transfer opening 48 of the service provider terminal. Transfer opening 148 is selectively opened and closed by a door 150. Door 150 is preferably movable between positions opening and closing transfer opening 148 by a door moving mechanism 152. Door 150 and the door moving mechanism 152 are preferably similar to those used in the service provider terminal.

In this exemplary embodiment, customer terminal 24 may include a carrier actuator mechanism 154 generally similar to carrier actuator mechanism 54 of the service provider terminal. The carrier actuator mechanism is also supported on a plate that generally restricts the flow of air therethrough. Of course it should be understood that in some embodiments a closure member for preventing air flow out of the lower portion of the housing may be provided on either the customer or service provider terminal.

The exemplary embodiment of customer terminal 24 includes an air flow mechanism, generally denoted 156, which operates to control the passage of air generally to and from the end of the transfer conduit 26 through customer terminal housing 149. In a manner similar to the service provider terminal, the exemplary air flow mechanism 156 includes a valve 160 extending through the customer terminal housing 149 at a valve location 162 which is circumferentially displaced from the transfer opening 148. In the exemplary customer terminal, the valve location 162 is generally axially aligned with the transfer opening 148, but circumferentially displaced approximately 180°. This construction is merely exemplary, and other constructions may be used in other embodiments.

Air flow through the valve 160 is controlled by operation of a gate assembly, generally denoted 166, which includes a generally planar gate member 168. As in the service provider terminal, the gate member is selectively positionable between a blocking position in which the gate member 168 blocks air flow through the valve 160, and an open position away from the blocking position. The rate of air flow through the valve 160 is related to the extent of displacement of the gate member 168 away from the blocking position.

The exemplary gate assembly 166 also includes a reversible motor 170 and a gate actuator mechanism 174. In the exemplary customer terminal 24, the gate actuator mechanism 174 is in operable connection with an upper end 176 of the gate member 168 to selectively raise the gate member away from the blocking position or lower the gate member into the blocking position responsive to operation of motor 170. (See FIG. 10). The motor operates responsive to the control circuitry, schematically indicated 193.

In a similar manner to that previously described with reference to the service provider terminal, the gate actuator mechanism 174 includes an elongated actuator arm 178 operatively connecting the motor 170 with gate member 168. Gate member 168 is generally comprised of a rectangular, planar sheet member dimensioned to be received within U-shaped slots 180 of the guide members 182 and to be movable therein.

The actuator track 184 of the customer terminal gate assembly 166 is disposed along the upper end 176 and includes an elongated slot 186 which is oriented to be generally perpendicular to the path of travel of gate member 168. Slot 186 is dimensioned to receive a pin 188 which is mounted at one end of elongated actuator arm 178. The other end of actuator arm 178 is operably connected to motor 170. Motor 170 is supported by a motor mount bracket 190.

The gate assembly 166 is mounted in supporting connection with a frame member 192, which may be formed with, welded or otherwise mounted to the customer terminal housing 149 in a generally sealed manner. The frame member 192 may include a dividing wall 194 operative to define an air chamber 196. In the exemplary embodiment, the range of travel of the gate member 168 generally coincides with the open height of the air chamber 196. The gate assembly 166 includes various seal members and gaskets to reduce or prevent undesirable air flow through the gate assembly when the gate member is in the blocking position.

The air flow mechanism 156 for the customer terminal 24 further includes a cover assembly, generally denoted 200. The cover assembly 200 includes an elongated housing member 202 mounted in supporting connection with housing 149 in covering relationship with the gate assembly 166. In the exemplary customer terminal 24, the housing member 202 has a capped top end 204 and an open bottom end 206. The housing member 202 defines a channel for air flow, indicated by arrows 210, in flow communication with the interior 212 of customer terminal housing 149 through the valve 160 when the gate member 168 is disposed away from the blocking position. In the exemplary embodiment, a screen member 214 is positioned between the open bottom end 206 and the valve location 162 in order to filter air and reduce noise as air flows in the air flow mechanism 156. The valve 160 and the transfer opening 148 are generally axially aligned. Thus, if a carrier actuator mechanism 154 is utilized, the mechanism is not directly in the path of the air flow.

Figure 10:
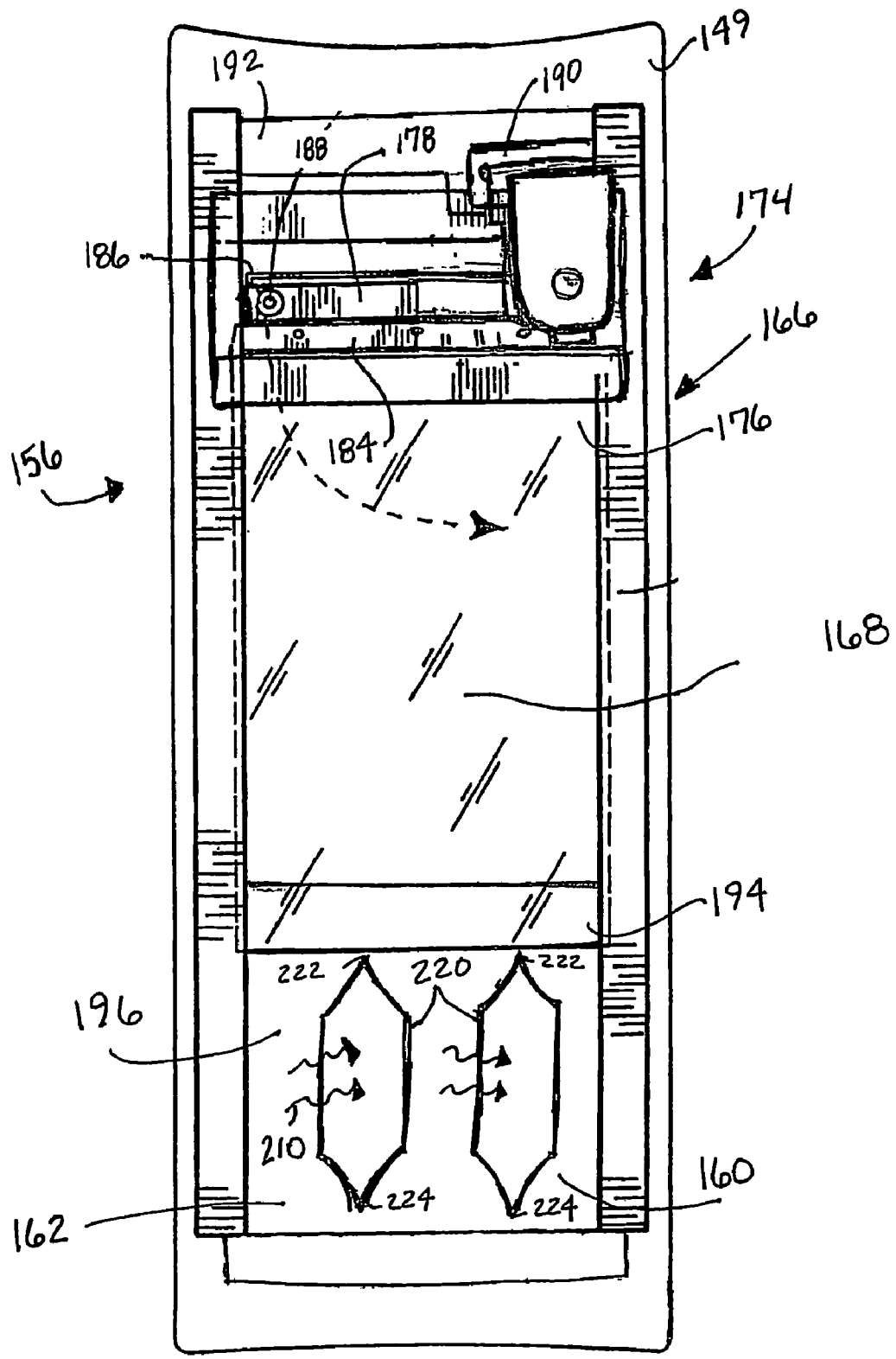
FIG. 10 is a view of a second gate assembly illustrating the operation thereof.

With particular reference to FIG. 10, in the exemplary embodiment, valve 160 is associated with at least one, and preferably two, axially elongated valve openings 220 in customer terminal housing 149 for the passage of air between the atmosphere and the interior 212 of the housing, and ultimately to the transfer conduit 26. In the exemplary embodiment, each valve opening 220 comprises a shape similar to a hexagon projected onto a curved surface. In the exemplary embodiment, the valve openings 220 are disposed in adjacent relationship with a line connecting opposed vertices 222, 224 being parallel to the longitudinal axis of the housing 149.

In the exemplary embodiment the valve openings extend upward to a point generally below an upper seal ring of a carrier when the carrier is fully downward in the terminal. The valve openings also extend downward generally above the lower seal ring when the carrier is positioned fully downward in the terminal. As discussed previously this configuration in the exemplary embodiment, when the valve is open, enables atmospheric pressure to act on the area below the upper seal ring of the carrier to initially move the carrier upward from its lowermost position in the terminal when a negative pressure is drawn above the carrier. Further when the carrier is moved upward sufficiently beyond the openings, atmospheric pressure acts behind the carrier on the lower seal ring to move the carrier upward. Also when a carrier is coming downward into the terminal, the position of the lowermost extent of the openings helps to assure that the carrier movement onto the carrier actuator mechanism is cushioned by air pressure in the area of the housing below the openings. Of course this configuration is exemplary.

The angled upper and lower surfaces bounding the valve openings of the exemplary embodiments help serve to reduce the risk that the surfaces will engage and damage the seal rings on the carrier. This is because the angled surfaces are less likely to snag on the annular seal rings which are biased radially outward from the carrier than surfaces that extend generally perpendicular to carrier movement. In addition, the pointed upper ends of the exemplary openings provide minimal area for air flow compared to the main portion of the slots. As a result if a carrier is misaligned slightly due to a malfunction or other condition so that the upper seal ring of the carrier is slightly below the upper end of the slot, the amount of air flow that can pass into the housing above the upper seal ring is limited by the small area at the upper end of the pointed slots, and generally the carrier will still have sufficient force applied behind one or both seal rings to move upward. Also the pointed configuration of the lower end of the slots operates to help slow and cushion the carrier as it moves downward to a resting position in the terminal. This is because as the lower seal ring on the carrier moves downward the open area of the slots through which air in the housing below the carrier can exhaust, becomes smaller. Of course in the exemplary embodiment when the seal ring moves fully downward, the lower seal ring moves below the bottom of the slots. This decreasing air flow area with further downward movement and the cushioning effect of air compressed in the housing below the carrier and the slots helps to more gradually slow and cushion the carrier as it enters the terminal and moves downward to engage the carrier actuator mechanism. Of course these approaches are exemplary and in other embodiments other approaches may be used.

The exemplary valve openings 220 permit atmospheric air to pass into the housing interior 212 when gate member 168 is raised away from the blocking position, and behind the carrier, if the carrier is being moved out of the customer terminal 24 by negative pressure applied above the carrier. If the carrier is being received into customer terminal 24, the valve openings 220 permit air to pass out of the housing in front of the carrier if the gate member is disposed away from the blocking position, in a manner similar to operation of the service provider terminal 22.

The customer terminal 24 may include a catch pan and/or drain lines connected to the area below the transfer opening 148 for catching and safely draining water that may enter the housing interior due to rain or snow. In some embodiments the drain opening may be controlled by an electrically actuated valve which is operated to be closed when the carrier is arriving in the terminal to maintain the housing area below the chamber closed and preserve the cushioning effects of air pressure below the carrier. Alternatively the drain openings may be sized so air flow therethrough is limited to be sufficiently slow to maintain the cushioning effect of the air column below the carrier. Of course these approaches are exemplary.

Figure 9:
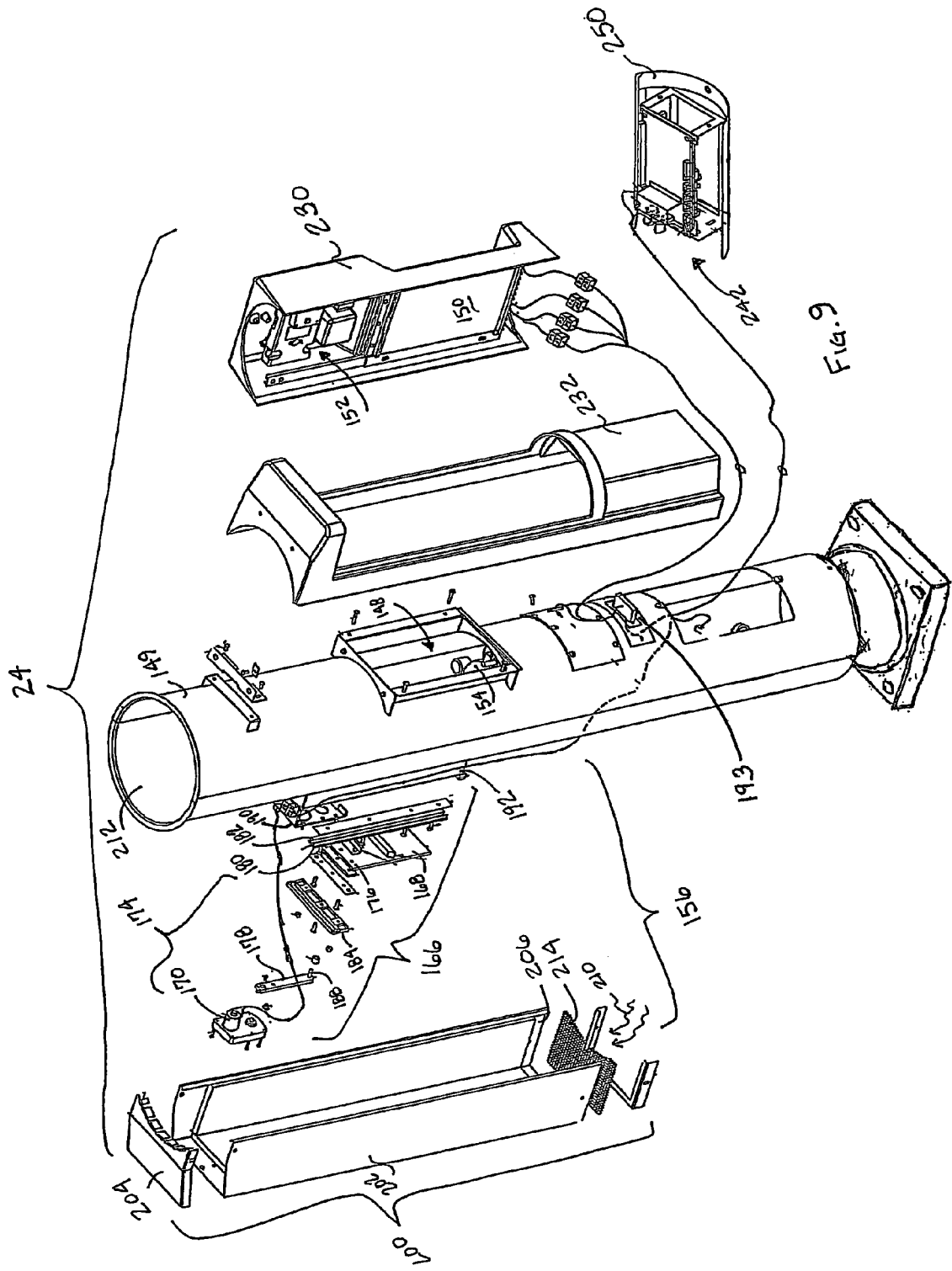
FIG. 9 is an exploded view of the customer terminal of FIG. 7.

With reference to FIG. 9, the door 150 and door moving mechanism 152 for customer terminal 24 is supported and operative within a facade member 230 mounted in supporting connection with housing 149 adjacent the transfer opening 148. Customer terminal 24 may also include a fascia 232.

In the exemplary embodiment, with reference again to FIG. 4, the service provider terminal 22 includes a panel member 240 mounted in supporting connection with fascia 132. Panel member 240 has mounted thereon certain components utilized as part of a control mechanism 242 which includes control circuitry operative to selectively control movement and the position of the door 50 and gate member 68. With reference to FIG. 9, the customer terminal 24 includes a panel member 250 mounted in supporting connection with housing 149. Panel member 250 has mounted thereon certain components utilized as part of the control mechanism 242 to direct movement of the door 150 and gate member 168. The control mechanism 242 includes components carried on panel member 240 and panel member 250 which are in operative connection. The control mechanism 242 may include control circuitry including a controller which includes a processor, a memory, and other electrical components for operating electrical components of the system. Alternatively or in addition control circuitry may include transformers, relays, power supplies and other suitable components. The various electrical components of the system are connected to the control mechanism through suitable electrical connectors. While the components of the exemplary control mechanism are shown positioned within the service provider and customer terminals 22, 24, respectively, it should be understood that in other embodiments, the control mechanism may be positioned in other suitable locations, for example, in a local or remote control panel. Further, while the control mechanism is shown as operating in a dedicated controller environment, other embodiments may employ a separate special purpose or general purpose computer which controls a plurality of different types of devices in response to programs operating therein. Suitable interfaces may be provided for communicating with and controlling the various components in the system with the computer.

Figure 11:
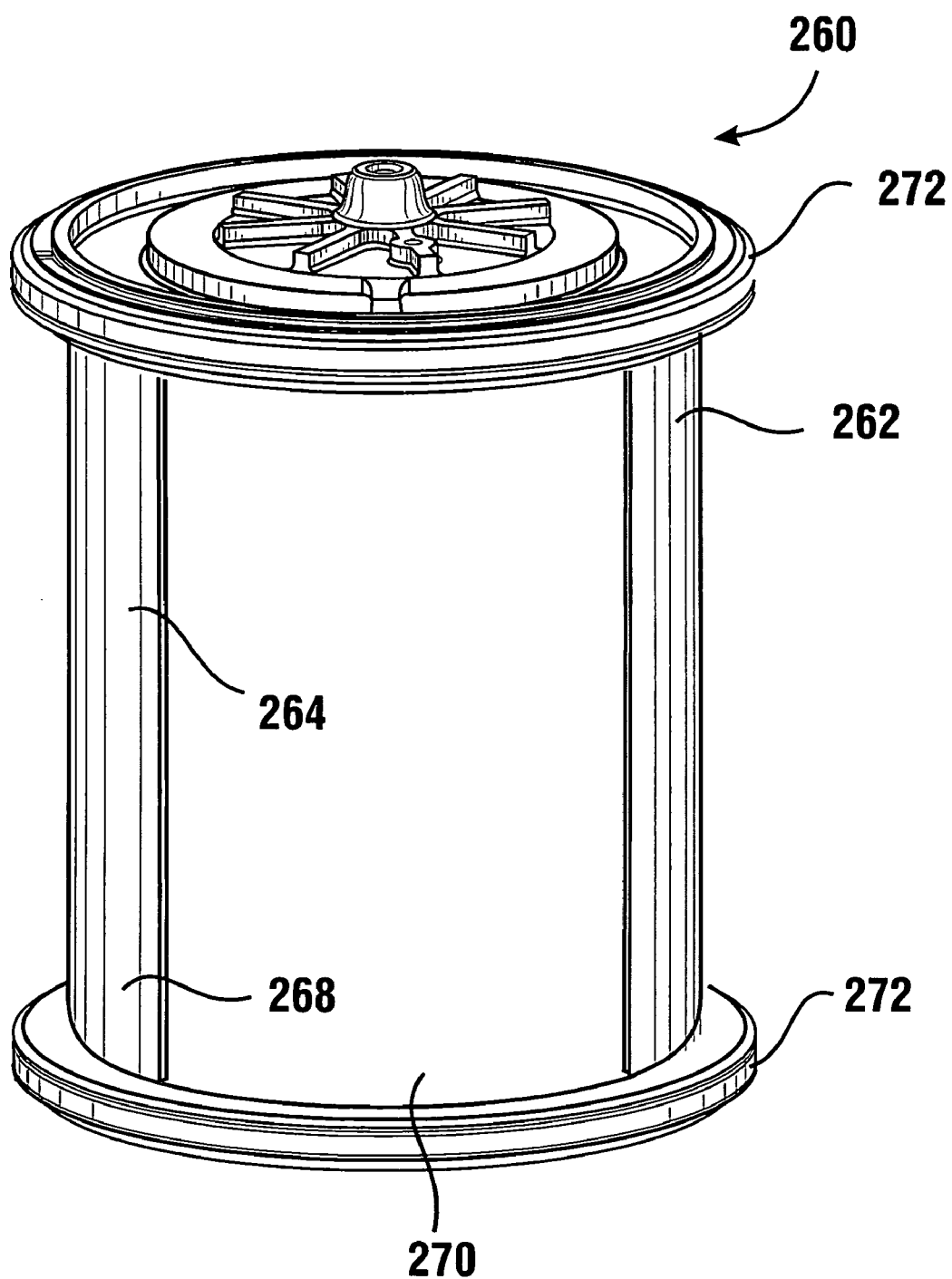
FIG. 11 is an isometric view of an exemplary carrier.

In embodiments of the service provider terminal 22 and the customer terminal 24 comprising carrier actuator mechanisms 54, 154, respectively, a carrier such as that described in previously incorporated U.S. Pat. No. 6,146,057 may be utilized to transport objects between the terminals. An exemplary carrier 260 is shown in FIG. 11. The actuator mechanisms 54, 154 are operative to orient an opening in the housing 262 of the carrier with respective transfer openings 48, 148. The actuator mechanisms 54, 154 also operate to move an inner shell 264 relative to an outer shell 268 so as to bring openings in the inner and outer shells into alignment which enables accessing the interior area 270 of the carrier. The carrier includes annular resilient seals 272, which are also referred to as accelerator rings. The accelerator rings provide slidable and generally fluid tight engagement between the carrier housing and an interior wall of the transfer conduit. This enables the carrier to be moved in the transfer conduit by differential pressure on opposite sides of the carrier.

Other embodiments may utilize other constructions of service provider and customer terminals that do not employ actuator mechanisms 54, 154. Thus, carriers having other constructions may be utilized. For example, the exemplary air flow mechanisms 56, 156 may be suited for use in pneumatic transport systems employing non-captive carriers. In such systems the carriers can be removed from the terminal housing at either the service provider end, customer end, or both, to facilitate placing or removing items from the carrier, or changing carriers.

The control mechanism and the included control circuitry coordinates movement of doors 50, 150, gate members 68, 168 and blowers 28, 30 to selectively transport the carrier between terminals. An exemplary transfer process begins with the system powered on and initialized so as to enable the system to operate in a run mode. For purposes of this example it will be presumed that a carrier is present at the service provider terminal and an initial user input is made by a user through an input device to move the carrier to the customer terminal 24. The input may be through the service provider entering a command on the control panel 46 of the service provider station. The control mechanism operates the door moving mechanism 52 to close door 50 at the service provider terminal.

If the door 150 at the customer terminal 24 is open, the door moving mechanism 152 operates to close the door 150.

After the control circuitry of the system confirms that the doors of both the service provider terminal and the customer terminal are closed, the control mechanism activates first blower 28 and lowers gate member 168 at the customer station into the blocking position to close valve 160.

Blower 28 operates to draw a vacuum in the transfer conduit 26 in the area above customer terminal 24. The negative pressure above the carrier causes atmospheric pressure behind the carrier to cause the carrier to move upward through leg portion 23 of the transfer conduit. In the initial position, gate member 68 in the service provider terminal 22 is initially displaced away from the blocking position (i.e. lowered and air flow is enabled) so that valve 60 is open and air can flow behind the carrier. The noise associated with air flow into the housing is minimized by the exemplary construction which includes the openings, housing and air filter.

Once the carrier passes the area of the conduit where blower 28 is connected thereto, the blower is shut off and the carrier descends on a cushion of air in the air pocket between the valve 160 and the carrier. The descent of the carrier into the customer terminal may be controlled by the rate of air flow past the accelerator rings which are the annular seals at each end of the carrier. Alternately, gate member 168 may be selectively disposed away from the blocking position (i.e., raised) in a manner as controlled by a processor or other control circuitry to control the rate of descent. Movement of the carrier can be controlled, and the noise associated with the arrival of the carrier is reduced by the air flow through the openings, the housing and filter.

When the carrier reaches the fully downward position the customer terminal, the carrier engages the actuator mechanism. If not earlier performed, the control mechanism operates the gate actuator mechanism 174 to displace gate member 168 away from the blocking position (i.e. raised) to open valve 160.

The control mechanism operates the door moving mechanism 152 at the customer terminal 24 to open door 150. Once door 150 is open the customer is enabled to manually contact and access the carrier and remove the transported items. The customer may also insert items into the carrier for transfer to the service provider.

The system may receive a command to transfer the carrier from the customer terminal to the service provider terminal. The command may be entered from the control panel 146 on the customer terminal or the control panel 46 on the service provider terminal. The control mechanism operates the door moving mechanism 152 to close door 150. The control mechanism checks the status of door 50 at the service provider station. If the door 50 is open, the control mechanism operates the door moving mechanism 52 to close door 50.

The control mechanism activates second blower 30 so as to draw a vacuum above the service provider terminal 22. The gate member 68 at the service provider terminal is placed into the blocking position (i.e. raised) to close valve 60. The carrier moves upward from the customer terminal 24 in response to the vacuum being drawn above the service provider terminal as air pressure acts behind the carrier through open valve 160. The noise associated with the air flow is minimized by the valve structure, housing and air filter. Upon reaching the conduit above the service provider terminal the carrier falls downward to the service provider terminal based on the controlled air flow past the accelerator rings on the carrier. Alternately, valve 60 may be opened in a controlled manner by disposing (i.e. lowering) the gate member 68 away from the blocking position.

When the carrier arrives at the service provider terminal 22, the carrier engages the carrier actuator mechanism. If not earlier performed, the control mechanism operates the gate actuator mechanism 174 to dispose gate member 68 away from the blocking position (i.e. lowered) to open valve 60.

The control mechanism operates door moving mechanism 52 at the service provider terminal 22 to open door 50. Once door 50 is open, the service provider in enabled to contact and access the carrier. At this point, the system has essentially returned to the initial condition able to receive a command to move the carrier again.

If the system includes a carrier such as carrier 260 and carrier actuator mechanisms 54, 154, the control mechanism 242 may be configured so as to operate the carrier actuator mechanisms to align and open the carrier as necessary. Of course this approach is merely exemplary. Also as discussed, the principles described may also be used in connection with other pneumatic tube system types, including those in which a carrier is removable from a housing through an access opening.

It should be understood that in the above described process, the control mechanism and control circuitry may include timing routines so as to provide a fault indication if the desired function is not accomplished within a set time period. Likewise, embodiments may include error recovery-type routines so that desired functions may be re-tried in the event of an initial failure.

Thus, the exemplary form pneumatic transfer system achieves the above-stated objectives, eliminates difficulties encountered in the use of prior devices, solves problems, and attains the desirable results described herein.

In the foregoing description certain terms have been used for brevity, clarity, and understanding. However, no unnecessary limitations are to be implied therefrom because such terms are for descriptive purposes, and are intended to be broadly construed. Moreover, the descriptions and illustrations given herein are by way of examples and the invention is not limited to the exact details shown or described. In addition, any feature that is described in the following claims as a means for performing a function shall be construed as encompassing any means capable of performing the recited function and shall not be deemed limited to the means disclosed in the foregoing description or mere equivalents thereof.

Having described the features, discoveries and principles of the invention, the manner in which it is constructed, utilized, and operated, and the advantages and useful results attained, the new and useful structures, devices, elements, arrangements, parts, combinations, systems, equipment, operations, methods and relationships are set forth in the appended claims.

I claim:

1. Apparatus comprising:
    a service provider terminal including:
        a tubular first housing having a first longitudinal axis and defining a first interior area,
            wherein the first housing includes a carrier support member in the first interior area,
            wherein the first housing includes a first transfer opening therein,
                wherein the first transfer opening is adapted to enable access therethrough to a movable pneumatic carrier supported with the carrier support member;
        a first door assembly including a generally planar first door,
            wherein the first door is movable between a first closed position closing the first transfer opening and a first open position disposed from the first closed position, and
        a first air flow mechanism operable to control air flow into and out of the first interior area,
            wherein the first air flow mechanism includes at least one first valve opening extending through the first housing at a first valve location circumferentially spaced from the first transfer opening,
                wherein the first valve location is above the carrier support member,
            wherein the first air flow mechanism includes a first gate assembly including a generally planar first gate member selectively movable into and away from a first blocking position,
                wherein, in the first blocking position, the first gate member is operable to generally prevent air flow through the at least one first valve opening.

2. The apparatus of claim 1 further comprising:
    a customer terminal including:
        a tubular second housing having a second longitudinal axis and defining a second interior area, wherein the second housing includes a second transfer opening therein, wherein the second transfer opening is adapted to enable access therethrough to a movable pneumatic carrier;
        a second door assembly including a generally planar second door, wherein the second door is movable between a second closed position closing the second transfer opening and a second open position disposed from the second closed position, and
        a second air flow mechanism operable to control air flow into and out of the second housing interior area, wherein the second air flow mechanism includes at least one second valve opening extending through the second housing at a second valve location circumferentially spaced from the second transfer opening, and a second gate assembly including a generally planar second gate member selectively movable into and away from a second blocking position, wherein in the second blocking position the second gate member is operable to generally prevent air flow through the at least one second valve opening.

3. The apparatus of claim 2 wherein the first air flow mechanism further comprises:
    a first cover assembly including a first housing member having an open top end and a capped bottom end, wherein the first housing member defines a first air flow channel, wherein the first cover assembly is mounted in supporting connection with the first tubular housing in covering relation with the first gate assembly, and wherein when the first gate member is disposed away from the first blocking position, the first air flow channel is in flow communication with the first interior area through the at least one first valve opening.

4. The apparatus of claim 3 wherein the second air flow mechanism further comprises:
    a second cover assembly including a second housing member having a capped top end and an open bottom end, wherein the second housing member defines a second air flow channel, wherein the second cover assembly is mounted in supporting connection with the second tubular housing in covering relation with the second gate assembly, and wherein when the second gate member is disposed away from the second blocking position, the second air flow channel is in flow communication with the second interior area through the at least one second valve opening.

5. The apparatus of claim 4 wherein the first gate assembly includes:
    a reversible first motor, and
    a first gate actuator mechanism mounted in supporting connection with a lower end of the first gate member, wherein the first gate actuator mechanism is operable responsive to the first motor to lower the first gate member away from the first blocking position and to raise the first gate member into the first blocking position.

6. The apparatus of claim 5 wherein the second gate assembly includes:
    a reversible second motor, and
    a second gate actuator mechanism mounted in supporting connection with an upper end of the second gate member, wherein the second gate actuator mechanism is operable responsive to the second motor to raise the second gate member into the second blocking position and to lower the second gate member away from the second blocking position.

7. The apparatus of claim 6 and further comprising:
at least one control mechanism in operative connection with the first and second door assemblies and the first and second air flow mechanisms, wherein the at least one control mechanism is operative to cause predetermined movement of the first and second doors and the first and second gate members.

8. The apparatus of claim 7 and further comprising:
a transfer conduit extending between the service provider terminal and the customer terminal;
a differential pressure generating mechanism operably connected to the transfer conduit; and
a carrier movable between the service provider terminal and the customer terminal within the transfer conduit responsive to operation of the differential pressure generating mechanism.

9. The apparatus of claim 8
wherein the differential pressure generating mechanism includes a first blower operable to produce a vacuum in the transfer conduit above the customer terminal, and wherein the differential pressure generating mechanism includes a second blower operable to produce a vacuum in the transfer conduit above the service provider terminal,
wherein the at least one control mechanism is in operative connection with the differential pressure generating mechanism, wherein the at least one control mechanism is operative to coordinate operation of the at least one differential pressure generating mechanism with the predetermined movement of the first and second doors and the first and second gate members.

10. The apparatus of claim 2 wherein the at least one first valve opening includes at least two adjacent elongated first valve openings in the first housing.

11. The apparatus of claim 10 wherein the at least one second valve opening includes at least two adjacent elongated second valve openings in the second housing.

12. The apparatus of claim 1 wherein the at least one first valve opening is bounded by at least one surface angled relative to the first longitudinal axis.

13. The apparatus of claim 1 wherein the at least one first valve opening includes a hexagonal shape.

14. The apparatus of claim 1 wherein the at least one first valve opening is circumferentially disposed at least 90° from the first transfer opening.

15. The apparatus of claim 1 wherein the first gate assembly configuration limits movement of the first gate member, wherein the first gate member is only movable into the first blocking position in a vertically upward direction, and wherein the first gate member is only movable away from the first blocking position in a vertically downward direction.

16. The apparatus of claim 1 wherein the first transfer opening is at a first transfer opening location, and wherein the first valve location is generally aligned with the first transfer opening location in a direction substantially perpendicular to the axis.

17. A method comprising:
a) positioning a movable pneumatic carrier at a first terminal having a longitudinal axis,
wherein the first terminal includes a tubular housing having a first longitudinal axis and defining a first interior area,
wherein the housing includes a carrier support member in the first interior area,
wherein the carrier support member provides support to the carrier,
wherein the housing includes both a first transfer opening extending therethrough and at least one first valve opening extending therethrough,
wherein the first transfer opening is adapted to enable access therethrough to the carrier,
wherein the at least one first valve opening is circumferentially disposed from the first transfer opening,
wherein the at least one first valve opening is located above the carrier support member;
b) providing a vacuum in a transfer conduit in a space above the carrier;
c) maintaining a first door that is movable relative to the first transfer opening, in a closed position,
wherein the first door is movable between the closed position closing the first transfer opening and an open position disposed from the closed position; and
d) during at least a portion of both (b) and (c), opening a first valve to supply air behind the carrier by displacing a first gate member away from a blocking position that generally prevents air flow through the at least one first valve opening.

18. The method of claim 17 wherein in (d), displacing the first gate member includes operating a first gate actuating mechanism in operative connection with a lower end of the first gate member to lower the first gate member.

19. The method according to claim 17 wherein the first transfer opening is at a first transfer opening location, wherein the at least one first valve opening is at a first valve location, wherein the first valve location is generally aligned with the first transfer opening location in a direction substantially perpendicular to the axis, and wherein (d) includes displacing a first gate member away from a blocking position that generally prevents air flow through the at least one first valve opening at the first valve location.

20. A method comprising:
a) positioning a movable pneumatic carrier at a first terminal having a longitudinal axis,
wherein the first terminal includes a tubular housing having a first longitudinal axis and defining a first interior area,
wherein the housing includes a carrier support member in the first interior area,
wherein the carrier support member provides support to the carrier,
wherein the housing includes both a first transfer opening extending therethrough and at least one first valve opening extending therethrough,
wherein the first transfer opening is adapted to enable access therethrough to the carrier,
wherein the at least one first valve opening is circumferentially disposed from the first transfer opening,
wherein the at least one first valve opening is located above the carrier support member;
b) providing a vacuum in a transfer conduit in a space above the carrier;
c) maintaining a first door that is movable relative to the first transfer opening, in a closed position,
wherein the first door is movable between the closed position closing the first transfer opening and an open position disposed from the closed position;
d) during at least a portion of both (b) and (c), opening a first valve to supply air behind the carrier by displacing a first gate member away from a blocking position that generally prevents air flow through the at least one first valve opening;

e) receiving the carrier at a second terminal remote from the first terminal, having a longitudinal axis, wherein the second terminal includes a second transfer opening therein;

f) during at least a portion of (e), maintaining a second door that is movable relative to the second transfer opening, in a closed position;

g) during at least a portion of both (e) and (f), opening a second valve at the second terminal to allow air to escape in front of the carrier by displacing a second gate member away from a second blocking position relative to at least one second valve opening, wherein the at least one second valve opening is angularly disposed from the second transfer opening; and h) subsequent to (g), moving the second door to open the second transfer opening.

21. The method of claim 20 wherein in (g), displacing the second gate member includes operating a second gate actuating mechanism in operative connection with an upper end of the second gate member to raise the second gate member.

22. Apparatus comprising:
a pneumatic tube system terminal including:
a cylindrical housing,
wherein the housing includes a longitudinal axis extending in an axial direction,
wherein the housing is configured to enable a pneumatic carrier including a first end annular seal and a second end annular seal to move upward and downward in the housing,
wherein the housing includes a first opening,
wherein the first opening is configured to enable manual access to the carrier when the carrier is at the terminal,
wherein the housing includes at least one second opening,
wherein the at least one second opening is disposed from the first opening,
wherein the at least one second opening extends in the axial direction,
wherein air flow is enabled through the at least one second opening,
a movable access door,
wherein the door is movable between an open position where the carrier is manually accessible through the first opening, and a closed position where the carrier is not manually accessible through the first opening,
a valve operative to selectively control air flow through the at least one second opening,
wherein the valve is selectively operative to generally prevent air flow out of the at least one second opening as the carrier moves downward in the housing,
wherein the valve is operative to enable air flow into the housing through the at least one second opening as the carrier moves upward in the housing, and
wherein when the carrier is positioned at the terminal and is manually accessible through the first opening, the at least one second opening axially extends only between the first end annular seal and the second end annular seal.

23. The apparatus according to claim 22 wherein the at least one second opening comprises a plurality of second openings in the housing, wherein the plurality of second openings are circumferentially spaced from the first opening.

24. The apparatus according to claim 22 wherein each of the plurality of second openings has an upper end and a lower end, and wherein each of the upper end and lower end are bounded by surfaces that are each at an angle relative to horizontal.

25. The apparatus according to claim 24 wherein at least one of the upper end and lower end are bounded by angled surfaces which converge to form a point.

26. The apparatus according to claim 25 wherein the valve is part of an air flow arrangement, wherein the air flow arrangement comprises a movable generally planar member, wherein positioning of the planar member is operative to control air flow through the second openings.

27. The apparatus according to claim 26 and further comprising at least one guide in supporting connection with the housing, wherein the planar member is movable in supporting connection with the at least one guide.

28. The apparatus according to claim 27 wherein the planar member is movable vertically, and wherein air flow is controlled responsive to vertical positioning of the planar member.

29. The apparatus according to claim 26 and further comprising a body in supporting connection with the housing, wherein the body has an interior area in fluid communication with the valve, and wherein the interior area includes an opening to atmosphere.

30. The apparatus according to claim 29 wherein the opening to atmosphere is disposed from the second openings.

31. The apparatus according to claim 30 wherein the opening to atmosphere is vertically disposed from the second openings.

32. The apparatus according to claim 31 and further comprising a filter in supporting connection with the body, and wherein the filter is disposed fluidly between the second openings and the opening to atmosphere.

33. The apparatus according to claim 29 and further comprising:
a first motor in operative connection with the access door;
a second motor in operative connection with the generally planar member;
control circuitry in operative connection with the first motor and the second motor, wherein the control circuitry is operative to selectively cause the first motor to operate to cause the access door to close blocking access to the carrier at the terminal in the housing, and to operate the second motor to enable air flow into the housing while the access door is closed.

34. The apparatus according to claim 22 and further comprising
a cylindrical pneumatic carrier,
wherein the carrier includes spaced annular seals,
wherein when the carrier is manually accessible in the housing through the first opening, the seals are spaced from each other in the axial direction and the at least one second opening is axially positioned between the seals.

* * * * *